(12) United States Patent
Maucksch

(10) Patent No.: US 7,895,480 B2
(45) Date of Patent: Feb. 22, 2011

(54) METHOD FOR TESTING THE ERROR RATIO BER OF A DEVICE ACCORDING TO CONFIDENCE LEVEL, TEST TIME AND SELECTIVITY

(75) Inventor: Thomas Maucksch, Tuntenhausen (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 683 days.

(21) Appl. No.: 10/575,339

(22) PCT Filed: May 27, 2004

(86) PCT No.: PCT/EP2004/005727

§ 371 (c)(1),
(2), (4) Date: Sep. 8, 2008

(87) PCT Pub. No.: WO2005/041470

PCT Pub. Date: May 6, 2005

(65) Prior Publication Data

US 2008/0320344 A1    Dec. 25, 2008

(30) Foreign Application Priority Data

Oct. 9, 2003   (EP) ................................. 03022922

(51) Int. Cl.
*G06F 11/00* (2006.01)
(52) U.S. Cl. ..................................... 714/704
(58) Field of Classification Search ............... None
See application file for complete search history.

(56) References Cited

FOREIGN PATENT DOCUMENTS

WO    WO 02/89390 A1    11/2002

OTHER PUBLICATIONS

International Preliminary Report on Patentability.
Search Report.
HFTA-05.0, Statistical Cofindence Levels for Estimating BER Pobability, Maxim Application Notes, Oct. 26, 2000, pp. 1-6.
Dudewicz, et al., Modern Mathematical Statistics, Modern Mathematical Statistics, 1998, pp. 514-526, 520, 526.

*Primary Examiner*—Jeffrey A Gaffin
*Assistant Examiner*—Guerrier Merant
(74) *Attorney, Agent, or Firm*—Ditthavong Mori & Steiner, P.C.

(57) ABSTRACT

A method for testing the error ratio BER of a device under test against a specified allowable error ratio comprises the steps: measuring ns samples of the output of the device, thereby detecting ne erroneous samples of these ns samples, defining BER(ne)=ne/ns as the preliminary error ratio and deciding to pass the device, if the preliminary error ratio BER(ne) is smaller than an early pass limit EPL(ne). The early pass limit is constructed by using an empirically or analytically derived distribution for a specific number of devices each having the specified allowable error ratio by separating a specific portion DD of the best devices from the distribution for a specific number of erroneous samples ne and proceeding further with the remaining part of the distribution for an incremented number of erroneous samples.

8 Claims, 5 Drawing Sheets

$D := 0.000085 \quad ne := 1,2..\ 1000$ $$\text{bernormpass}(ne,D) := \frac{2ne}{\text{qchisq}(1-D,2\cdot ne)} \qquad \text{bernormfail}(ne,D) := \frac{2ne}{\text{qchisq}(D,2ne)}$$

$M := 1.5 \quad D := 0.000085 \quad ne := 1,2..\ 1000$ $$\text{berlimbad}_{pass}(ne,D) := 2\cdot \frac{ne}{\text{qchisq}(1-D,2\cdot ne)}\cdot M \qquad \text{berlim}_{fail}(ne,D) := 2\cdot \frac{ne}{\text{qchisq}(D,2\cdot ne)}$$

METHOD FOR TESTING THE ERROR RATIO BER OF A DEVICE ACCORDING TO CONFIDENCE LEVEL, TEST TIME AND SELECTIVITY

The invention concerns a method for testing the error ratio BER of a device under test against a specified allowable error ratio.

The statistical test can be an example of the test of a digital receiver for example for cellular mobile phones as a Device Under Test (DUT). The test shall decide if the DUT fulfils a specified Bit Error Ratio (BER) or not. The true BER is not target of the test.

It is the object of the invention to design an optimal test. The invention derives and exploits the knowledge, that the test is governed by the 3 parameters above Confidence level, Test time and Selectivity.

In the state of the art the test could actually be optimised according to only the two parameters Test time and Confidence level only without awareness of Selectivity.

In WO 02/089390 A1 the test exploits well known properties of the distributions. If errors occur independently, this can be mathematically described by the binomial distribution. If errors occur rarely (lim BER→0) it can be described by the Poisson Distribution. The Poisson Distribution is used to derive pass and fail criteria.

With a finite number of samples ns, the final bit error ratio BER cannot be determined exactly. Applying a finite ns, a number of errors ne is measured. ne/ns=ber is the preliminary bit error ratio.

In a single test a predefined number of samples ns is applied and a number of errors ne is measured. ne is connected with a certain differential probability in the Poisson distribution. The probability and the position is not known in the distribution conducting just one single test. Repeating this test infinite times, applying repeatedly the same ns, we get the complete Poisson distribution. The average number of errors is NE. NE/ns is the final BER.

The Poisson Distribution can be defined as $$dpois(ne, NE) = (NE^{ne}/ne!)e^{-NE} \quad (1)$$

The Poisson distribution, shown in FIG. 1, has the variable ne and is characterized by the parameter NE. Real probabilities to find ne between two limits are calculated by integrating between such limits.

It has to be noted, that the Poisson distribution is an approximation: Independent error occurrence is described by the binomial distribution. If the BER approaches 0 the Poisson distribution approximates the binomial distribution. Hereafter it is shown, that Poisson Distributions and the Chi Squared Distribution are equal. Just the form is different. On the other hand there are two inverse cumulative operations. One of them, the chi square one, is useful for our purpose.

The experiment, the Poisson distribution is based on, is: having observed a certain number of samples ns, the number of events ne is counted to calculate the ratio ne/ns. The experiment, the Chi Square distribution is based on, is: having observed a certain number of events ne, the number of samples ns is counted to calculate the ratio ne/ns. Poisson and Chi Square are valid only if ne<<ns.

The experiment of the Chi Square distribution is always terminated by an event. In contrast the experiment of the Poisson distribution almost never is terminated by an event because of ne/ns→0. This explains that the Poisson distribution needs one event more to equal in its form the Chi Square distribution. The equivalence is as follows:

$$2*dchisq(2*NE, 2*ne) = dpois(ne-1, NE)$$

$$2*dchisq(2*NE, 2*(ne+1)) = dpois(ne, NE) \quad (2)$$

We have seen: Chi Square and Poisson both describe the same distribution. Both are functions of 2 variables ne (integer) and NE (real). However both are not commutative in NE and ne. Hence there are two inverse operations (3) and (4):

$$D = \int_0^{ne} dpois(ni, NE)dni = 2*\int_0^{ne} dchisq[2NE, 2\cdot(ni+1)]dni \quad (3)$$

with: D is the wrong decision probability or confidence level (input)

ni is the integration variable ne is the measured value (input, discrete). It is the integration limit.

NE (real) is tuned such that the integral is consistent.

It returns an NE as a function of the two parameters D and ne: qchisq (D, ne), qchisq is the inverse cumulative chi square function.

$$D = \int_0^{NE} dpois(ne, NI)dNI = 2*\int_0^{NE} dchisq[2NI, 2\cdot(ne+1)]dNI \quad (4)$$

with: NI is the integration variable.

NE (real) is the integration limit.

ne (discrete) is tuned such that the integral is consistent.

It returns ne as a function of the two parameters D and NE: qpois (D, NE), qpois is the inverse cumulative Poisson function.

Our target requires equation (3). This is usually called the Inverse Cumulative Chi Square function. Equation (4) is the solution for another target. This is usually called the Inverse Cumulative Poisson function. (3) returns a greater NE than (4) returns with respect to ne. (3) returns a continuous NE, (4) returns a discrete ne.

An introduction into the notion of confidence range is explained as follows. In a single test ns samples and measure ne errors are applied. The result can be a member of different distributions each characterized by another parameter NE. We ask for two of them:

1) The worst possible distribution $NE_{high}$, containing our measured ne with [D=e.g. 0.0085%] probability in the sense:

$$0.000085 = \int_0^{ne} dpois(ni, NEhigh)dni \quad (5)$$

with: ni is the integration variable ne is the measured value

NE is the variable to tune in order to make the integral consistent.

The result of the inverse cumulative operation is $NE_{high}$.

2) The best possible distributions $NE_{low}$, containing our measured ne with [D=0.0085%] probability in the sense:

$$0.000085 = \int_{ne}^{\infty} dpois(ni, NElow)dni \quad (6)$$

The result of the inverse cumulative operation is $NE_{low}$.

To illustrate the meaning of the range between $NE_{low}$ and $NE_{high}$ the following may be helpful: In the case the measured value is ne, the final mean value NE can be found with high probability (100%-2*0.0085%) in the range from $NE_{low}$ to $NE_{high}$, called confidence range.

The inverse cumulative Chi Squared distribution gives the wanted results:

Inputs: number of errors ne, measured in this test. Probability D and the complementary probability 1−D Output: NE, the parameter describing the average of the distribution.

An example can be found in FIG. 2.

Same as the width of the distributions the confidence range increases proportional to SQR ne, which means, it increases absolutely, but decreases relatively to the measured number of errors.

In this section the notion of the confidence range is used to calculate the early pass and early fail limit.

If the entire confidence range is found, calculated from a single result ne, on the good side of the specified limit it can be stated: With high probability 1-D, the final NE is better than the limit.

If the entire confidence range is found, calculated from a single result ne, on the bad side of the specified limit it can be stated: With high probability 1-D, the final NE is worse than the limit.

Transcription of the above text into formulas lead to the following. The current number of samples ns is calculated from the preliminary ber and the preliminary ne with:

$$ber = ne/ns \quad (7)$$

$$BER_{limit} = NE_{limit}/ns \quad (8)$$

for abbreviation in the formula: $ber_{norm} = ber/BER_{limit} = ne/NE_{limit}$ (normalized ber)

Early pass stipulates: $NE_{high} < NE_{limit}$

Early fail stipulates: $NE_{low} > NE_{limit}$

An example of the early fail and the early pass limit are displayed in FIG. 3. According to FIG. 3 an unfavourable test can last infinite time, when the measured BER stays in between the limits. This requires an artificial stop condition. Whichever ne is proposed as a final stop condition, e.g. ne=200, the test can leave the area between the Early Pass and the Early Fail limit through the open end of the right side of FIG. 3. This situation needs an arbitrary pass or fail decision, e.g. pass, if the test hits the vertical 200 error line. This situation has the following drawback: The test has two different qualities. A good one with wrong decision risk D, when the test hits an early pass or early fail limit, and a worse and variable one, when the test hits the vertical 200 error line. This is variable and is depending on the height, it crosses the line. The quality of the test in terms of wrong decision probability is variable in the range D to 50%. As already proposed in WO 02/089390 A1 the situation can be improved by a better trade-off: Instead a test with different qualities against one limit, we design a test with a fixed uniform quality against two limits.

WO 02/089390 A1 preserves the definition of the early fail limit: A DUT is failed and the probability of D=0.0085% is accepted, that is actually better than the limit.

WO 02/089390 A1 proposes a meaningful redefinition of the early pass limit: A DUT is passed and the probability of D=0.0085% is accepted, that is actually worse than M times the limit (M>1). M is the Bad DUT Factor.

An example for M=1.5 is shown in FIG. 4. This produces the following consequences:

The early pass limit is shifted upwards by the factor of M.
The early fail and the early pass limit intersect.
The intersection coordinates are the normalized test limit and the maximum number of events.
This leads to the following $berlimbad_{pass}$: early pass limit against the bad DUT limit $berlim_{fail}$: early fail limit against the specified limit.

In WO 02/089390 A1 a pass and a fail limit for any instant in the test is calculated. However the decision is only allowed at one predefined instant in the test. The wrong decision risk for a single test step is D. However it is desirable to have a predefined wrong decision risk F for the entire test. The approach to derive F from D is explained here and is discussed in PCT-application PCT/EP03/00970 not published before the priority date of this application.

Provided a single BER trajectory with final BER on the limit hits the early fail limit. If a fail is decided at this instant of the test, the wrong decision risk is as small as D. For each member of a large population of DUTs a wrong decision can happen, with probability D, accumulating to an amount F>D for the entire population. D is the wrong decision probability based on the statistical totality of samples with BER on the limit. F is the wrong decision probability based on the statistical totality of DUTs with BER on the limit. The same holds for a bad DUT, hitting the early pass limit.

We call D the wrong decision probability at a single test step and F the wrong decision probability for the entire test. For a real test it is desirable to define in advance the wrong decision probability F of the entire test. An exact theory is not available for this problem. It is proposed to derive D from F by the following simulation: A large population of DUTs with BER on the limit is simulated and decided against the early pass and early fail bound, with a free D-parameter in the early pass and fail limit. The simulation will show, that a certain fraction F (D<F<1) falsely fails. The complementary simulation is: A large population of DUTs with M*BER (bad DUT) is simulated and decided against the early pass and early fail bound, with a free D-parameter in the early pass and fail limit. The simulation will show, that a certain fraction F (D<F<1) falsely passes. Both false decision fractions are approximately equal and represent the wrong decision probability F for the entire test. D is tuned such that F corresponds to the predefined wrong decision probability.

In the present state of the art the distribution of errors is considered in the totality of samples for one DUT. This assumes that the error events occurred independently and the BER is time independent. Furthermore, a distribution function is applied which is valid only for small BER (lim→0). From the statistics of errors in the totality of samples the theory returned a pass and a fail limit dependent on the wrong decision probability D (0<D<<1). The pass and fail limit can be calculated at any instant of the test (ordinal of error), however it may be used for decision just once at a predefined instant. The result at this instant can be pass, fail or undecided. The meaning of D is: One DUT is measured by determining BER at the predefined instant. If the BER at the predefined instant hits the pass\fail limit, it is decided accordingly and a wrong decision probability D is accepted.

If BER is beyond the pass\fail limit, the wrong decision probability is <D and we decide accordingly too. If BER is inside the pass\fail limits the wrong decision probability is >D and we cannot decide with the wanted quality. This method is not usable for test time reduction, however it is the basis for this.

In the not prepublished application PCT/EP03/00970 a method is proposed to apply an early pass and an early fail limit at any instant of the test. It demands the following definition for the wrong decision probability:

A DUT is measured by determining a series of preliminary BER (t): BER (t)=ne(t)/ns(t). t=0 is the start of the test. If the preliminary BER at any instant of the test hits the early pass\early fail limit, it is decided accordingly and a wrong decision probability F (0<F<<1) is accepted. The method to achieve the target was the following: A large number of DUTs with equal BER has been simulated, passed and failed against the pass fail limits derived with the above discussed. D has been tuned down, until a fraction F of the DUTs behaved according to the new definition (0<D<F<<1).

The notion of BAD DUT Factor M>1 was introduced as follows: A bad DUT is normally failed, however it may falsely pass with a wrong decision probability F. A good DUT on the specified limit is normally passed, however it may falsely fail with a wrong decision probability F. With the bad DUT factor M it could have been ensured that the early fail limit and the early pass limit intersect and the test was reliably finalised after a finite time.

However there are still the remaining drawbacks in the present state of the art:

There occurs a deformation of the distribution. If a DUT is decided pass or fail, it leaves the population of all DUTs and the remaining distribution is deformed. This deformation was not considered.

The shape of the pass and fail limit at each point of the test was calculated from the theory, applicable at just one point of the test. This shape was preserved when making the pass fail limits applicable at each point of the test. This gives away the possibility to shape the pass and fail limits for further optimisation.

Early pass and early fail limit are not independent. The early pass and the early fail limit are calculated independently without proving that this is justified. However in the measurement process they are used simultaneously. In reality the early pass and early fail limit are not independent. So the such calculated early pass and fail limit do not completely represent the reality of measurement.

As stated above the notion of Bad DUT factor is a trade-off between drawbacks. In addition the bad DUT factor M is not acceptable in any case. Specified Bit Error Ratios are in the order of magnitude 0.1% to 10%. Assuming a bad DUT Factor M=1.5 the equivalent bad DUTs are 0.15% to 15%. This is acceptable. Data throughput in a communication system is also of statistical nature and must be measured and decided pass or fail. The specified lower limit of throughput related to the ideal throughput in different throughput tests is in the range of a few % to near 100%. To make it comparable with BER, we define the complement of the relative throughput: lost relative throughput. Complementary this is in the range of near 100% down to a few % For e.g. lost relative throughput=1%, the currently used M=1.5 is highly meaningful. For e.g. lost relative throughput=99%, the currently used M=1.5 is obviously meaningless.

In the state of the art the early pass and early fail limit is based on just one, the following definition: A bad DUT may falsely pass with a wrong decision probability F and a good DUT may falsely fail with a wrong decision probability F. There are other, highly effective, definitions possible as well.

It is the object of the present invention to provide an test time optimized method for the statistical test for a device under test with a high selectivity, i.e. the device under test with a specific error ratio shall be passed with a specific probability, while a slightly worse device under test shall be failed with a high probability.

The object is solved by the features of claim 1.

According to the solution of the present invention the early pass limit is constructed by using an empirically or analytically derived distribution for a specific number of devices each having the specified allowable error ratio by separating a specific portion of the best devices from the distribution for a specific number of erroneous samples and proceeding further with the remaining part of the distribution for an incremented number of erroneous samples.

The dependent claims concern further developments of the invention.

The invention is further described with respect to the drawings. In the drawings FIG. 1 shows an example for a Poisson distribution curve;

A statistical test, for example the test of a digital receiver as a Device Under Test DUT, is discussed hereafter. The test shall decide if the DUT fulfils a specified Bit Error Ratio BER or not. The true BER is not target of the test.

The test has 3 dimensions of quality:

The decision shall be done correctly with high probability. This corresponds to a low wrong decision risk.

The test shall be decided pass or fail after as few samples as possible. This corresponds to short test time.

The selectivity shall be high, i.e. a DUT with the specified BER shall be passed with the above mentioned probability, while a slightly worse DUT shall be failed with high probability. Note, that test quality and DUT quality have to be distinguished.

Figure 1:
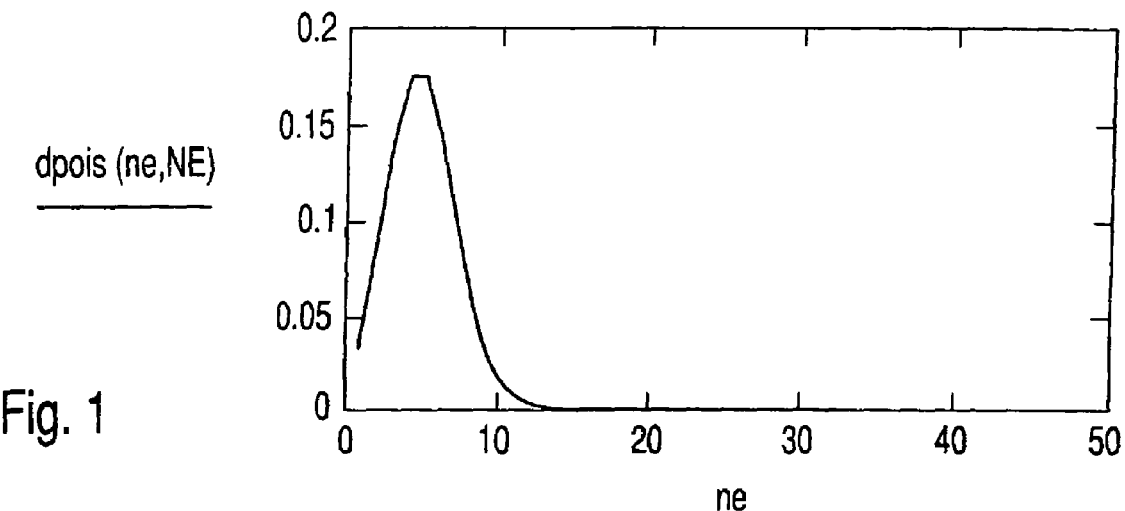
Figure 2:
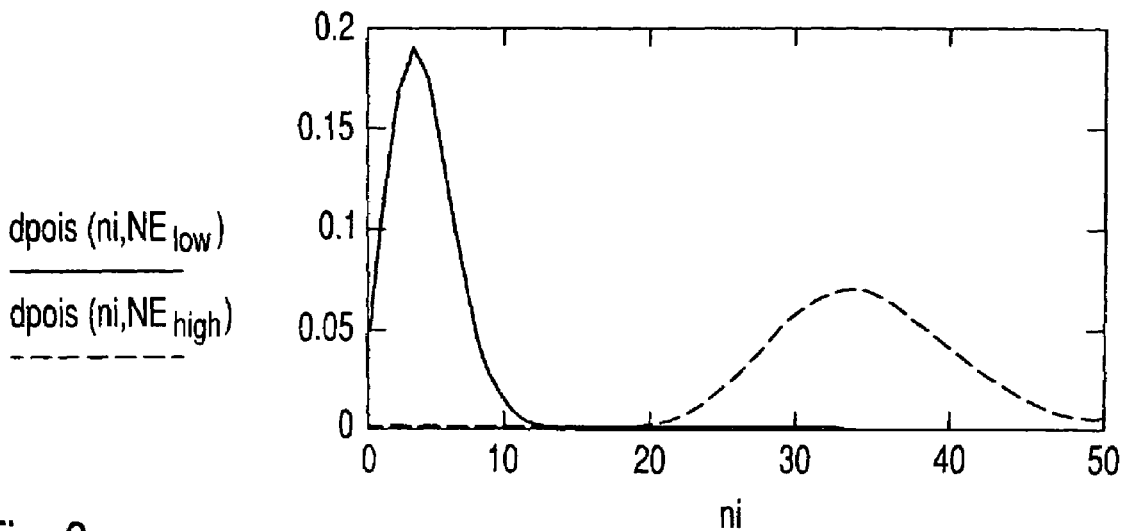
FIG. 2 shows an example for a confidence level.
Figure 3:
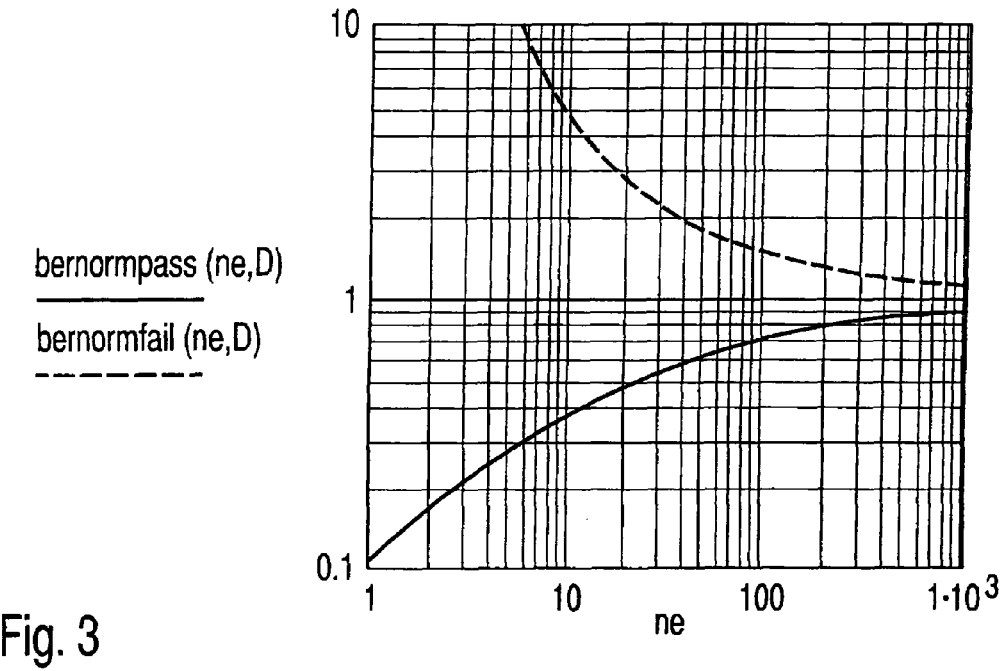
FIG. 3 shows the early pass and early fail limits.
Figure 4:
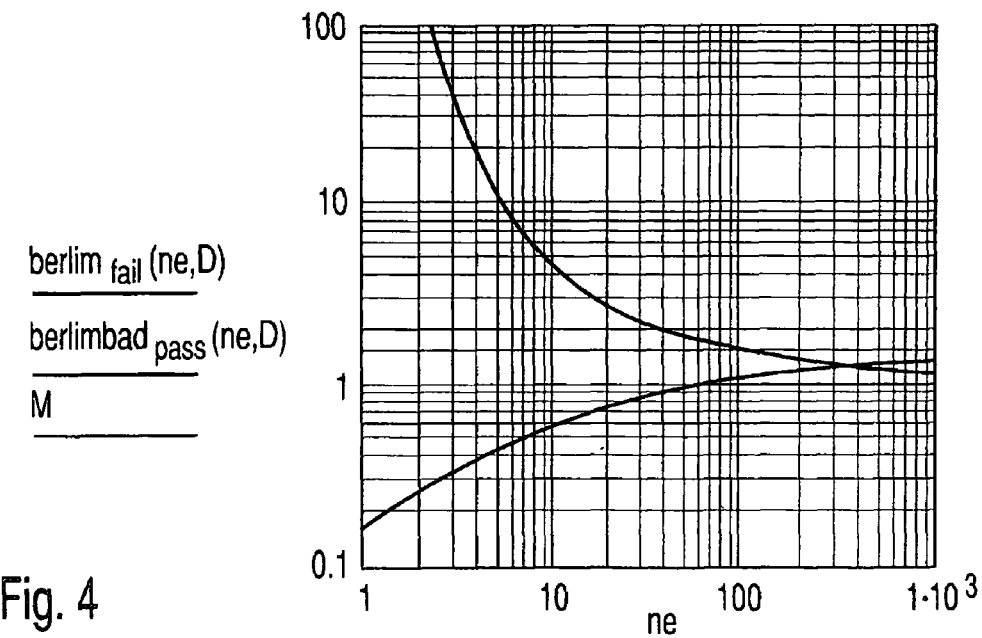
FIG. 4 shows an early pass and early fail limit with bad device factor M.
Figure 5:
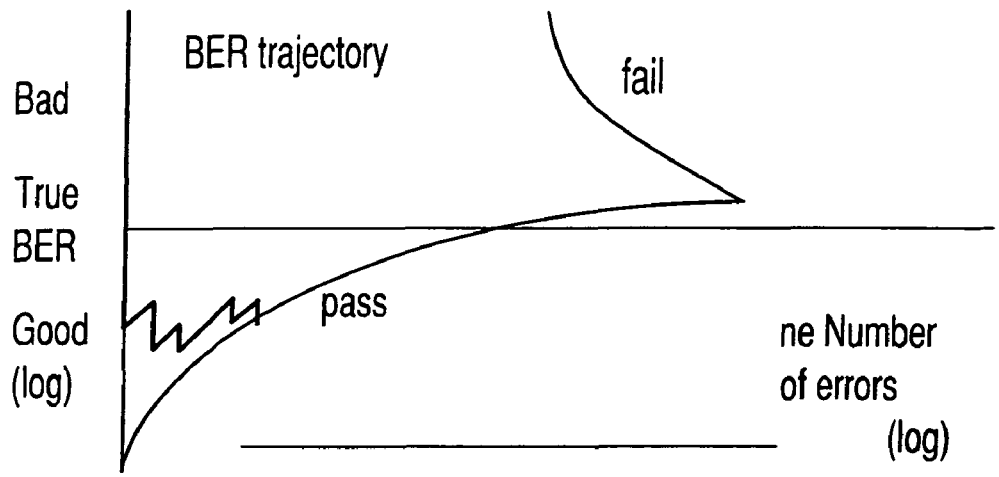
FIG. 5 shows an example of the measurement practice.

The preliminary BER is continuously determined and entered into the diagram as shown in FIG. 5. When the BER trajectory intersects the pass or fail limit, the DUT is decided accordingly.

For the invention literally the classical concept of probability is used: When P % of an infinite large population of DUTs is hit from a statistical event, then an individual of this population is hit by this event with a probability of P %. Hence it is discussed, simulated and calculated at a very large population of DUTs, to conclude for the probability that an individual is hit by the statistical event. If 99% of the population of DUTs, all with BER on the specified limit, hit the pass limit during the test, and 1% hit the fail limit, then 1 DUT with BER on the limit is decided pass with 99% probability and fail with 1% probability.

Figure 6:
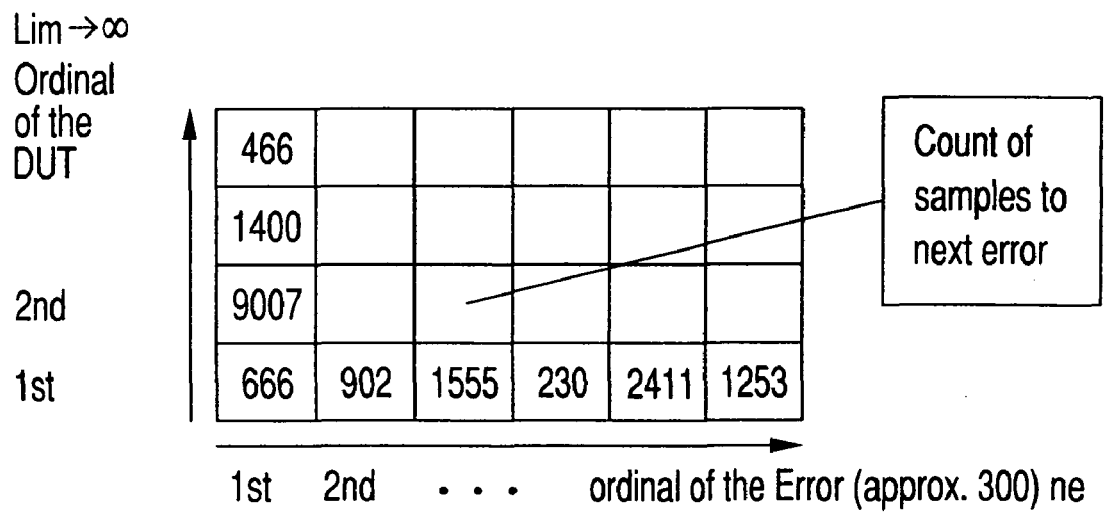
FIG. 6 shows an example of a simulation of devices under test.

To construct the pass fail limits, infinite many DUTs are simulated as shown in FIG. 6. The numbers in the table are created using a pseudo random generator repeatedly according to the following:

Random number [0 . . . 1]

Above true BER: correct

Below true BER: error

Count until the first (next) error occurs

Enter the count into the array of FIG. 6

The interpretation is as follows: The pseudo random generator represents the BER characteristics of the DUT. Errors occur independently and the true BER is time independent.

One line represents the preliminary BER(ne) of a single DUT. BER(ne) is the ordinal of error at this instant divided by the sum of samples from the left to this instant, with ne=number of errors. This can be better understood from the following example.

EXAMPLE

BER at the first error: 1/666
BER at the second error: 2/(666+902)
BER at the third error: 3/(666+902+1555)

The set of all rows represent the BER(ne) evolution of the population of DUTs. The left column represents the BER (ne=1) of all DUTs when the $1^{st}$ error occurs. This can be obtained from the inverse number of samples. The $ne^{th}$ column represents the BER (ne) of all DUTs when the ne error occurs.

Other BER characteristics can be simulated with corresponding generators: e.g. we can re-use a modified form system simulations, deriving the receiver BER (including channel decoder) under fading conditions, creating non independent and time variant bit errors.

The first point of the early pass limit is constructed by the following rules: Take the left column and separate the DD (e.g. 1%) best from the (1-DD) (e.g. 99%) worst DUTs. The BER value at the separation point of the worst of DD best DUTs marks a point of the early pass limit. The best DUTs are from now on regarded as pass and leave the population and the worst DUTs are regarded as undecided and are processed in the same way to construct the next point of the early pass limit by using column 1 with column 2.

As an example for the first point of the pass limit separating the 25% best DUTs form the 75% worst ones gives the first point of the early pass limit: BER=1/9007

The second point of the early pass limit is constructed as follows: Using column 1 (left) with column 2, however disregarding all lines with already passed DUTs we repeat the process. We separate the DD (e.g. 1%) best from the (1-DD) (e.g. 99%) worst DUTs. The BER value at the separation point marks the second point of the early pass limit. The best DUTs are from now on regarded as pass and leave the population and the worst DUTs are regarded as undecided and are processed in the same way to construct the next point of the early pass limit.

Figure 7:
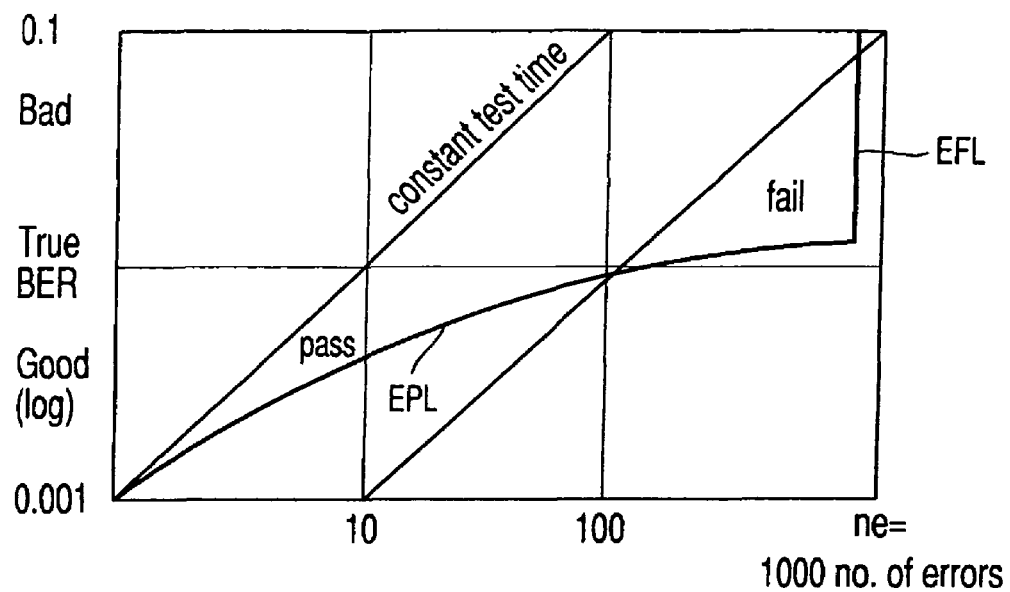
FIG. 7 shows an example for an early pass and early fail limit.

This way an early pass limit EPL in FIG. 7 is constructed (controlled) and an early fail limit EFL in FIG. 7 gets implicitly (uncontrolled). The horizontal line represents the true BER. This is the basis for construction. The early pass limit may intersect the true BER due to deformation of the distribution. The good decided DUTs leave the distribution and shift the undecided part distribution towards the bad direction.

In the construction, a certain DD is selected (e.g. 1% of the current undecided population) and the separation process until FF is repeated until (e.g. 99% of the initial population) is decided pass. The undecided rest is declared fail. This guarantees a limited test time. In this example this needs 229 steps.

FF is the pass probability for the entire test. DD is the pass probability for a single test step. DD is selected so that it passes a constant partition of the remaining undecided population. There are many possibilities for DD for one target FF. A smaller DD is used and the separation process is repeated more often to reach the final pass probability, e.g. separate 0.5% per step. This needs 459 steps to separate 99% of the initial population. Obviously the test keeps a pass probability at 99%. Some test time is lost. The quality, gained by this trade-off, is selectivity.

Figure 8:
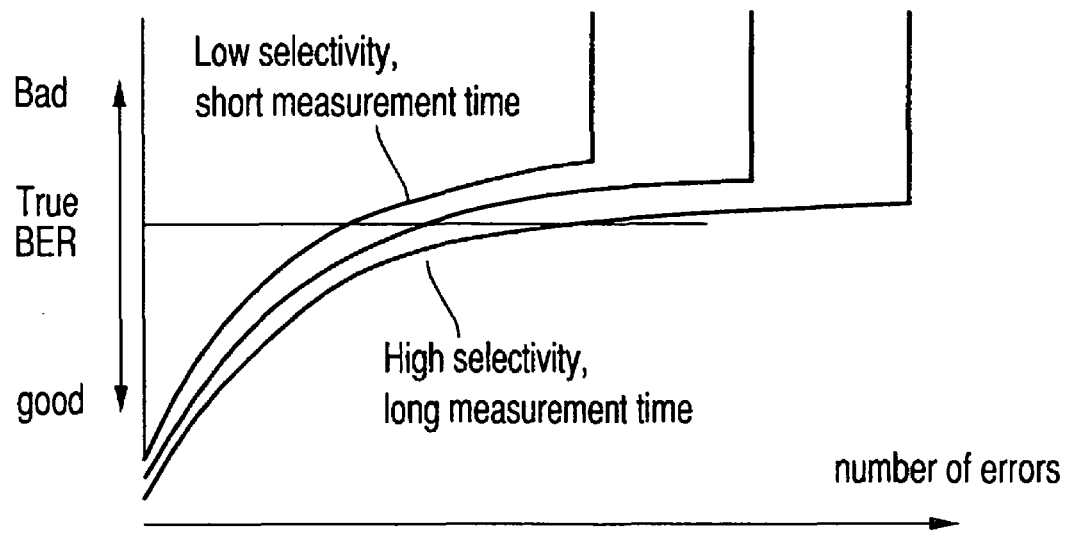
FIG. 8 shows a visualisation of selectivity.
Figure 9:
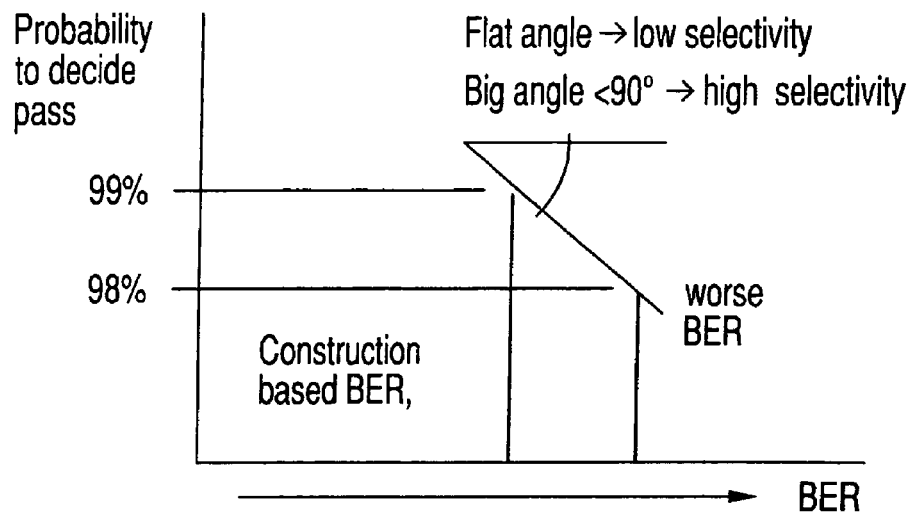
FIG. 9 shows another visualisation of selectivity.

A DUT on the specified BER limit passes with 99% probability according to the construction. Using the constructed pass and fail limits and applying them to a DUT, which is a little Δ higher in BER than the specified limit, the pass probability for that DUT can be determined, which is a little Δ lower than the specified limit. The ratio (Δ pass probability) to (Δ BER) is the selectivity of the test. A visualisation of selectivity is shown in FIG. 8 and FIG. 9.

In general two of the three parameters number of samples, correct decision probability and selectivity can be predefined. The third one can be derived.

The number of samples NS is minimized in the following sense: The maximum number of samples in the test is limited and the actual number of samples is dependent on the quality of the DUT.

Following relationship applies:

$$\text{Mean } NS(\text{better}) < \text{Mean } NS(\text{specified limit}) < \text{Max } NS \quad (9)$$

Max NS is the maximum number of samples. This number can be predefined or derived.

Mean NS (specified limit) is the mean number of samples in a test, when the DUT is on the specified limit. The actual number of samples in an individual test is not predictable. Mean NS (better) is the mean number of samples in a test, when the DUT is better than the specified limit. The actual number of samples in an individual test is not predictable, however the smaller, the more extreme the quality of the DUT. This is a strong motivation to design DUTs better than the specification, as it saves test time.

A DUT on the limit shall be passed with FF % probability. FF near 1 and correct with respect to pass is the conventional understanding of correct decision probability. However the principal can be used for any FF (0<FF<1) and it is free to understand correct with respect to fail. To optimize test time, we should construct (control) the pass limit and get the fail limit implicitly (uncontrolled), and not vice versa. The reason is the following: By nature a bad DUT is decided faster than a good one, see FIG. 7 at constant test time. So it is advantageous to optimize for a good DUT and disregard any optimisation for the bad DUT which is decided faster anyhow. If it is free to trade FF against the specified BER-limit, it is optimal for test time, to select an FF near 1. The reason is that this way the majority of the test is controlled and optimized and the minority is left uncontrolled.

The concept of selectivity describes the behaviour of the test, if the DUT deviates from the specified limit. As defined above, selectivity is a differential. However it can be used as a ratio of differences.

Selectivity is approximately $$(\text{pass probability} - (\text{the complement of the pass probability, which is the fail probability}))/(\text{Bad DUT BER} - \text{Specified DUT BER}). \quad (10)$$

This concept corresponds approximately to the former concept of Bad DUT factor M.

DD is the pass probability for a single test step. DD is the parameter which controls the test in all parameters: Correct Decision Probability, Test Time and Selectivity. Constant DD means relative equal separation of good DUTs from the remaining undecided population and means approximately:

$$\text{Number of good decided DUTs}(ne) = A/s * e^{-ne/s} \quad (11)$$

with:
A: A parameter proportional to the initial count of the population.
ne: number of errors, the variable in this function
s: a parameter proportional to selectivity This function often occurs in natural processes. It is felt to be optimal for the following reasons: More decisions at the beginning of the test at the expense of less decisions at the end of the test is good for test time but not fair. The notion of uniform selectivity gets meaningless. Less decisions at the beginning of the test at the expense of more decisions at the end of the test is bad for test time and is of no use, except if there are external constraints, e.g. no decision is allowed unless a minimum test time is elapsed. Then the concept is applicable after minimum test time is elapsed.

Figure 10:
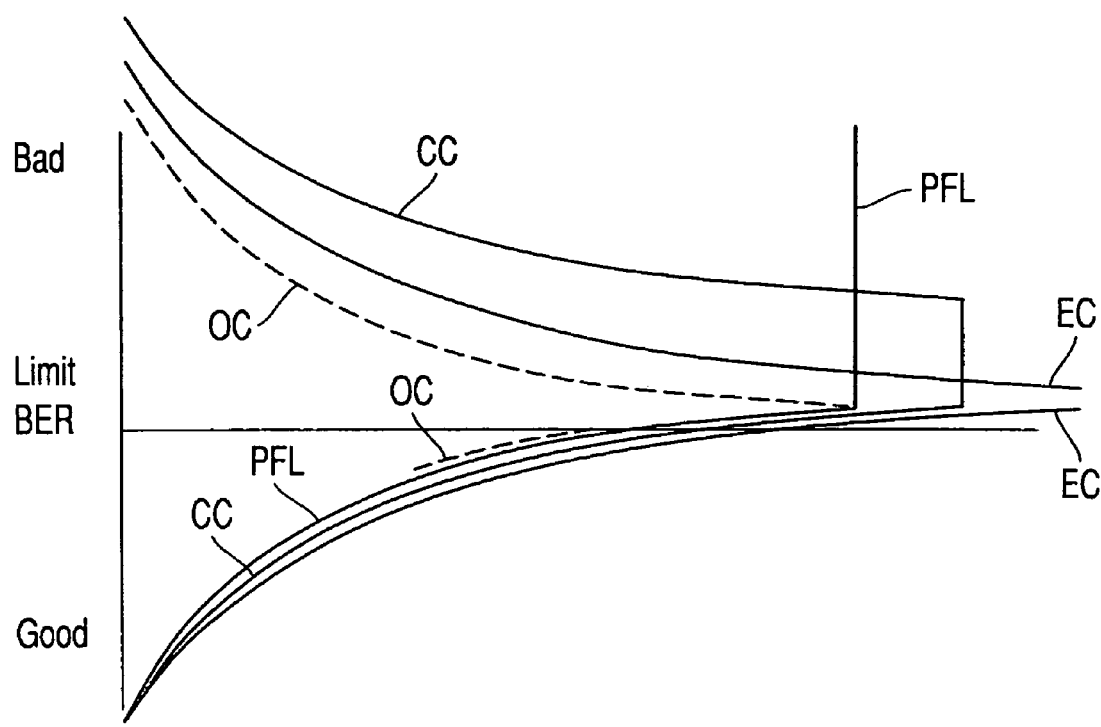
FIG. 10 shows modifications of pass and fail curves.

The pass fail limit PFL, shown in FIG. 10, was discussed above. The separation process was done only from the good side of the distribution. It is optimal fast for the 99% pass decided DUTs and is superior over the other curves for better DUTs. No optimisation effort is done for those 1% DUTs, which are decided fail. It is inferior for worse DUTs.

A compromise of test time with respect to pass and fail is done for the compromise curve CC in FIG. 10. The separation process is done from the good side and the bad side of the distribution simultaneously. E.g. 99% hit the pass curve, e.g. 0.5% hit the vertical fail line, 0.5% hit the fail curve. The 99% pass decided DUTs are decided a little bit slower. However the fail decided DUTs are decided a little bit faster in average.

This optimisation of test time with respect to pass and fail is driven into extreme with the extreme curves EC in FIG. 10. The separation process is done from the good side and the bad side of the distribution simultaneously. E.g. 99% hit the pass curve, 1% hit the fail curve. The 99% pass decided DUTs are decided a little bit slower compared to curve CC. However the fail decided DUTs are decided a little bit faster in average compared to curve CC. These curves have the disadvantage that the maximum number of samples is not limited although the average number of samples is optimized. Hence there is an infinite small probability that an unfavourable test lasts infinite time.

All three variants show that the pass and fail limits are not independent. The optimal curve OC in FIG. 10 seems optimal for both pass and fail. The separation process is done from the good side, constructing the pass limit, and then, in a second run, from the bad side constructing the fail limit, whereas the implicitly given fail limit ($1^{st}$ run) and the implicitly given pass limit ($2^{nd}$ run) are not used. This can be a practical solution. Although the pass and fail limits are not really independent, they are constructed as if they were independent. Therefore this solution is theoretically not fully justified and on the risky side. All curves have the free parameter selectivity.

The above mentioned description implies simulation to get the pass fail limits. This needs infinite computational effort for exact results. In case the BER characteristic of the DUT is given by independent error occurrence and time independent true BER, we give an analytical method. The computational effort is still high but not infinite for exact solution.

The left column of the array shown in FIG. 6 represents the BERs (ne=1) of all DUTs when the $1^{st}$ error occurs, with BER=inverse number of samples. The second column of the array shown in FIG. 6 represents the BERs (ne=2) of all DUTs when the 2 error occurs. BER(ne=2)=2 is divided by the horizontal sum of samples from the left to including column 2. The $ne^{th}$ column represents the BERs (ne) of all DUTs when the $ne^{th}$ error occurs. BER(ne)=ne is divided by the sum of samples from the left to including column ne.

This facts can be described analytically: The numbers in the left column follow the geometrical distribution:

$$P_1(ns)=BER \cdot (1-BER)^{ns-1} \quad (12)$$

with
BER: true BER of the DUT
$P_1$: probability to find the first error after ns samples, the variable in the distribution This distribution is already suited to construct the first point of the early pass limit: Separate the DD best from the (1-DD) worst part of the distribution. The BER value at the separation point marks the first point of the early pass limit. The part-distribution of the best DUTs is from now on regarded as pass and the part-distribution of the worst DUTs is regarded as undecided. It is called $U_1$(ns) and is further on processed. U stands for undecided.

The horizontal sum of column 1 and 2 in FIG. 6 is represented by the following distribution $$P_2(ns)=P_1(ns)*P_1(ns) \quad (13)$$

with
$P_2$: probability to find the second error after ns samples
*: convolution
$P_2$(ns) is not directly usable to construct the $2^{nd}$ point of the early fail limit, but it is $$T_2(ns)=U_1(ns)*P_1(ns) \quad (14)$$

with
$T_2$(ns): probability to find the second error after ns samples regarding the loss of the best DUTs from the previous step. T stands for transient.

The $T_2$(ns) part-distribution is suited to construct the second point of the early pass limit as follows: Separate the DD best from the (1-DD) worst part of the distribution. The BER value at the separation point marks the second point of the early pass limit. The part-distribution of the best DUTs are from now on regarded as pass and the part-distribution of the worst DUTs are regarded as undecided. It is called $U_2$(ns) and is the basis for the next step. This way we can construct the early pass limit point by point.

Even though the invention is described above with reference to the examples according to the accompanying drawings, it is clear that the invention is not restricted thereto, but it can be varied in several ways within the scope of the inventive idea.

The invention claimed is:

1. A method for testing a bit error ratio of a device under test against a specified allowable error ratio comprising the following steps:
   measuring ns samples of the output of the device, thereby detecting ne erroneous samples of these ns samples;
   defining BER (ne)=ne/ns as the preliminary error ratio; and
   deciding to pass the device, if the preliminary error ratio BER (ne) is smaller than an early pass limit EPL (ne),
   wherein the early pass limit is constructed by using an empirically or analytically derived distribution for a specific number of devices each having exactly the specified allowable error ratio by separating a specific portion DD of the devices from the distribution for a specific number of erroneous samples ne; and
   proceeding further with the remaining part of the distribution for an incremented number of erroneous samples,
   wherein DD represents pass probability.

2. The method for testing the error ratio according to claim 1, wherein the first point of the early pass limit is constructed by using an empirically derived distribution with the following steps:
   simulating the error behavior of a high number of devices each having the specified allowable error ratio,
   noting in a first column of a table the number $n_1$ of samples until the first error occurs for each individual device,
   calculating the preliminary error ratio BER (ne=1) of the first error by BER(ne=1)=1/$n_1$
   separating the DD devices and identifying a separation point, which marks the preliminary error ratio BER (ne=1) of another subset of the DD devices, as the first point EPL(ne=1) of the early pass limit.

3. The method for testing the error ratio according to claim 2, wherein the next point of the early pass limit is constructed by the following steps:

simulating the error behavior of the remaining devices, noting in the next column of the table the number $n_i$ of samples until the next error occurs for each individual device, calculating the preliminary error ratio BER(ne) of the next error by $$BER(ne) = ne \Big/ \sum_i n_i$$

separating the DD devices and identifying a separation point, which marks the preliminary error ratio BER(ne) of another subset of the DD devices, as the next point EPL(ne) of the early pass limit and repeating the above steps.

4. The method for testing the error ratio according to claim 2, wherein the simulating the error behavior is done with a random generator or a pseudo random generator.

5. The method for testing the error ratio according to claim 1, wherein the first point of the early pass limit is constructed by using an analytically derived distribution with the following steps:

defining a first preliminary distribution $$P_1(ns) = BER \cdot (1-BER)^{ns-1}$$

with

BER is the true error ratio of the device and $P_1$ is the probability to find the first error ne=1 after ns samples, separating the D D part from the 1-D D part of the distribution $P_1$ and identifying the separation point of the D D part from the 1-D D part as the first point EPL(ne=1) of the early pass limit and defining the 1-D D part of the first preliminary distribution $P_1$ as a first distribution $U_1$ of undecided devices.

6. The method for testing the error ratio according to claim 5, wherein the next point of the early pass limit is constructed by the following steps:

defining a next preliminary distribution $$T_2(ns) = U_1(ns) \ast P_1(ns)$$

With $T_2(ns)$ is the probability to find the next error after ns samples regarding the loss of the specific portion of the devices from the previous step and separating the D D part from the 1-DD part of the distribution $T_2$ and identifying the separation point of the DD part from the 1-D D part as the next point EPL (ne) of the early pass limit, defining the 1-DD part of the distribution $T_2$ as the next distribution $U_2$ of undecided devices and repeating the above steps.

7. The method for testing the error ratio according to claim 1, wherein the specific portion D D devices is selected with regard of the desired selectivity of the test.

8. The method for testing the error ratio according to claim 7, wherein the selectivity of the test is defined as (pass probability–(the complement of the pass probability, which is the fail probability))/(error ratio of a bad device–specified allowable error ratio).

* * * * *